(12) United States Patent
Matousek et al.

(10) Patent No.: US 6,632,135 B2
(45) Date of Patent: Oct. 14, 2003

(54) GRAIN HANDLING MODULE FOR HARVESTING SYSTEM

(75) Inventors: Robert Matousek, Milan, IL (US); Dennis P. Silver, Geneseo, IL (US); Jon Ricketts, Viola, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/041,133

(22) Filed: Jan. 7, 2002

(65) Prior Publication Data

US 2003/0130018 A1 Jul. 10, 2003

(51) Int. Cl.[7] .......................... A01D 17/02; A01F 12/46
(52) U.S. Cl. ........................................ 460/23; 460/114
(58) Field of Search ........................ 460/23, 119, 114; 414/502, 505; 56/14.6, 16.6

(56) References Cited

U.S. PATENT DOCUMENTS

| | | | | |
|---|---|---|---|---|
| RE24,920 E | * | 1/1961 | Palmer | 414/526 |
| 3,286,862 A | * | 11/1966 | Hansen | 414/502 |
| 4,317,326 A | * | 3/1982 | Riedinger | 56/14.6 |
| 4,428,182 A | * | 1/1984 | Allen et al. | 56/14.6 |
| 4,663,921 A | * | 5/1987 | Hagstrom et al. | 56/14.6 |
| 4,907,402 A | * | 3/1990 | Pakosh | 56/14.6 |
| 4,928,460 A | * | 5/1990 | Bruer et al. | 56/14.6 |
| 6,042,326 A | * | 3/2000 | Thomas et al. | 414/502 |
| 6,339,917 B1 | * | 1/2002 | Dillon et al. | 56/14.6 |

\* cited by examiner

Primary Examiner—Árpád Fábián Kovács
(74) Attorney, Agent, or Firm—John William Stader; Rebecca L. Henkel (57) ABSTRACT

A grain module for an agricultural combine. The module includes a longitudinally elongated grain tank. An endless conveyor conduit receives grain from the combine's grain tank and selectively feeds it into the module grain tank or removes it from the module grain tank. The module may comprise the rear section of an articulated combine vehicle wherein the front section contains grain threshing and separating systems.

15 Claims, 6 Drawing Sheets

GRAIN HANDLING MODULE FOR HARVESTING SYSTEM

FIELD OF THE INVENTION

This invention relates generally to agricultural crop harvesters. It relates particularly to agricultural combines and, more specifically, to an improved grain handling, storage and unloading system for a combine.

BACKGROUND OF THE INVENTION

A crop harvesting combine conventionally has a header assembly which cuts the crop and carries the cut crop to a feeder assembly. The feeder assembly, in turn, conveys the cut crop to a threshing assembly. In the case of a rotary threshing machine, the rotor assembly threshes grain, for example, from crop stalks and the grain, together with straw and chaff, falls through perforations in a cylindrical shroud which forms the outer shell of the threshing assembly.

The grain from the rotary threshing assembly falls onto a sieve assembly which oscillates, causing grain to fall through it while, at the same time, air under pressure is directed through the sieve assembly to blow straw and chaff out the rear of the combine. The clean grain which falls through the sieve assembly is collected on a grain pan and flows on the grain pan to a grain elevator.

The grain elevator conveys clean grain upwardly into a grain tank in the combine body; usually above the threshing assembly. This is normally accomplished with an elevator including a combination of horizontal and vertical auger or paddle conveyors which are arranged in conduits and continuously collect grain from the grain pan. The conveyors discharge the grain into the grain tank.

A recent innovation in grain harvesting, which has increased overall efficiency, involves the use of separate grain carts or modules. The grain carts or modules presently known are simply trailers containing large grain bins for storing the harvested grain. The use of such grain carts or modules permits the combine to continue harvesting when an onboard storage bin becomes filled with grain but a truck or wagon is unavailable for unloading the grain. The cart or module provides an interim storage location into which the combine can unload grain when its onboard bin becomes full.

A conventional grain module is simply towed behind the combine and filled with grain from overhead by the standard grain unloading conduit associated with the combine. The grain module, in turn, normally has a grain unloading conduit similar to that of the combine associated with it.

SUMMARY OF THE INVENTION

An object of the present invention is to provide an improved grain handling, storage and unloading system for an agricultural combine.

Another object is to provide a system of the aforedescribed character which incorporates an improved grain handling module.

Still another object is to provide an improved agriculture combine including a high capacity grain storage system.

A further object is to provide an articulated agricultural combine wherein the rear articulated section comprises a high capacity grain handling, storage and unloading module.

The foregoing and other objects are realized in different embodiments of the invention. In one embodiment, a multipurpose and high capacity grain handling module is attached to a conventional combine. The module accepts grain flow from the combine and distributes the grain to the proper location in its grain bin. Periodically the module is used to move the grain to another transport vehicle. In this one embodiment, the module includes a continuous loop elevator which encircles the module bin. The continuous loop elevator receives grain from combine bin storage and elevates it for discharge into the module bin.

In another embodiment of the invention, the combine comprises articulated front and rear sections, with the rear section being a grain handling module incorporating features of the aforedescribed first embodiment. In one variation, the rear section comprises a module with a continuous loop elevator which encircles the module bin from front-to-back. In another variation, the elevator forms a continuous loop on the front end of the bin.

BRIEF DESCRIPTION OF THE DRAWINGS

The invention, including its construction and method of operation, is illustrated more or less diagrammatically in the drawings, in which.

DETAILED DESCRIPTION OF THE PREFERRED EMBODIMENTS

Figure 1:
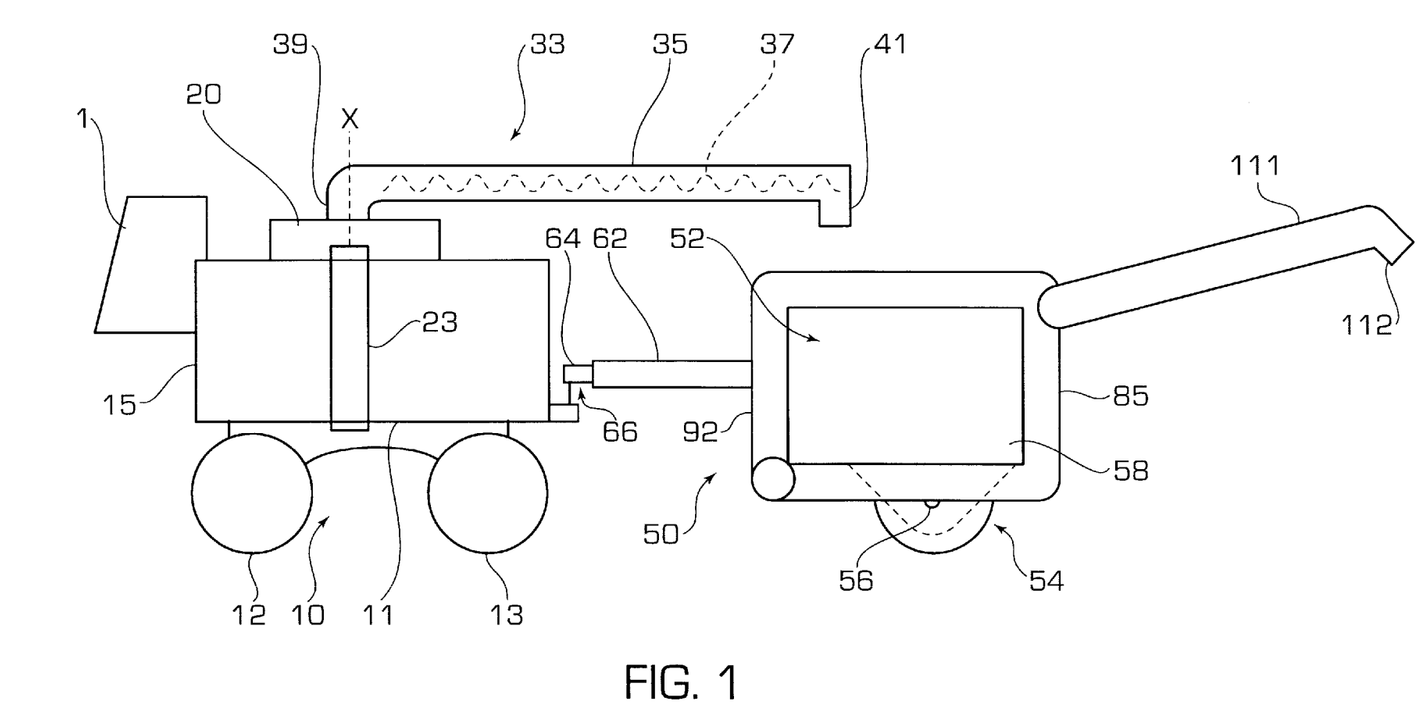
FIG. 1 is a side elevational view of a conventional rotary combine having a grain module comprising one embodiment of the invention connected to it.

Referring to the drawings, and particularly to FIG. 1, a self-propelled, rotary combine is seen generally at 10, with parts removed. The combine 10 includes a chassis 11 supported by two front wheels 12 and two rear wheels 13.

The chassis 11 supports a body 15 containing an internal combustion engine (not shown) which supplies power to the wheels 12 and 13. Also inside the body 15, mounted on the chassis 11, is a rotary threshing assembly (not shown) inclined upwardly from front-to-back in a conventional manner.

Above the rotary threshing assembly, within the body 15 and extending upwardly out of the body, is a grain tank 20. The tank 20 is mounted on the chassis 11. In front of the body 15, adjacent the grain tank 20, is an operator's cab 21 which is also supported from the chassis 11.

The combine 10 further includes a crop harvesting header assembly (not shown). The header assembly is connected to the front end of the chassis 11 by a harvested crop feeder assembly (not shown). As the combine 10 moves through a crop of grain, for example, the header assembly harvests the standing grain and delivers it to the feeder assembly, which feeds it to the rotary threshing assembly.

The rotary threshing assembly threshes the grain from its stalks and chops up the stalks into straw and chaff. Separated grain, straw and chaff fall out of the threshing assembly. The grain is deposited on a sieve assembly (not shown). The sieve assembly is oscillated while, at the same time, air is blown through it. The air blows straw and chaff out of the rear of the combine 10. The grain falls through the sieve assembly onto a grain pan (not shown). Grain flows from the grain pan into an auger conveyor 23 which elevates it into the grain tank 20.

When the grains tank 20 is full, it may be unloaded through an unloading system 33. The unloading system 33 comprises a horizontally elongated unloading conduit 35 containing an auger conveyor 37. The unloading conduit 35 is rotatable through 180° about vertical axis X at its inlet end 39. Grain may be unloaded through the discharge end 41 of the conduit 35 into a truck which is traveling beside the combine 10, if a truck is available at the time.

When a truck is not available and it is desirable to continue harvesting rather than stop and wait until a truck arrives, a separate grain module towed by the combine is sometimes used. The present invention is embodied in a new and improved grain module 50.

Figure 2:
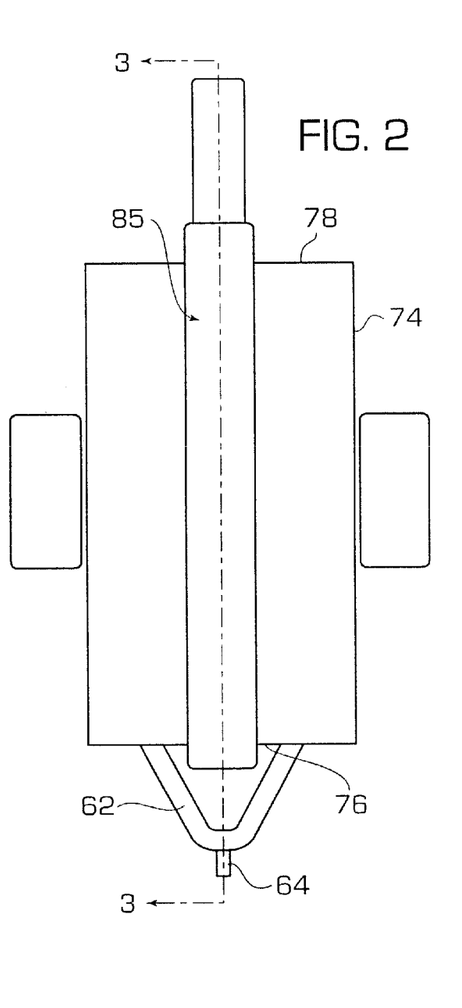
FIG. 2 is a top plan view of the grain module in FIG. 2.
Figure 3:
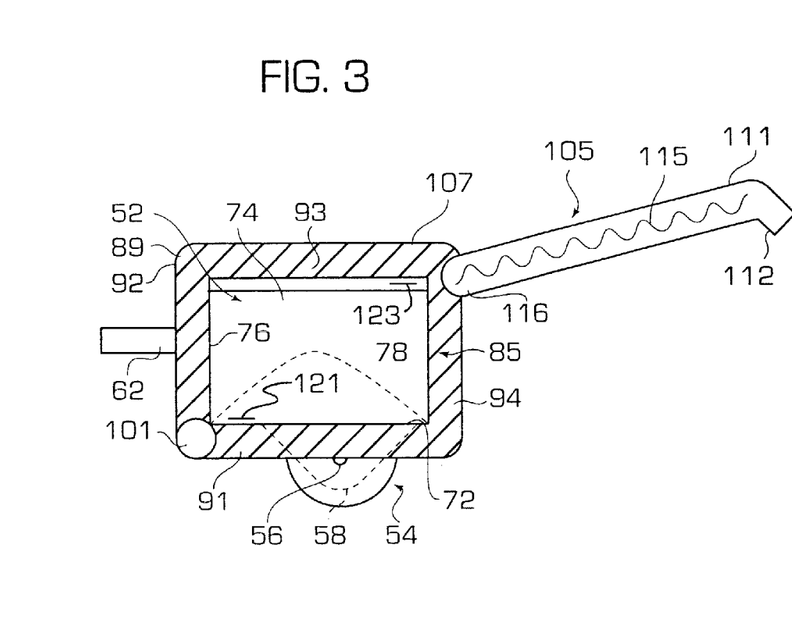
FIG. 3 is a vertical sectional view taken along line 4—4 of FIG. 3.

Referring also to FIGS. 2 and 3, the grain module 50 which comprises features of the invention is a wheeled vehicle comprising an axially elongated, rectangular body 52 carried by a pair of wheels 54. The wheels 54 are rotatably mounted on an axle 56 which supports the body 52 through an undercarriage 58.

The grain module 50 is connected to the chassis 11 of the combine 10 through a tow-bar 62. The tow-bar 62 has a hitch 64 at its front end. The hitch 64 contains a conventional locking mechanism for connecting it to a universal hitch post 66 on the combine chassis 11.

The grain module body 52 includes a horizontal floor 72, a pair of vertical 10 sidewalls 74 and vertical front and rear walls 76 and 78. The body, walls and floor form a grain bin, the top of which is open, as at 82.

Encircling the grain module body 52, from front-to-back, is a loop conveyor assembly 85. The loop conveyor assembly 85 includes a hollow conduit 87 containing a continuous loop, chain and paddle conveyor 89.

The loop conveyor conduit 87 includes a horizontal bottom run 91, a vertical front run 92, a horizontal top run 93 and a vertical rear run 94. The conveyor conduit 87 circles the module body 52 mid-way between its side walls 74, as best seen in FIG. 2.

The continuous loop, paddle conveyor 89 is driven in a clockwise direction through the conduit 87 by a hydraulic drive motor 101 mounted on the front wall 76 of the body 52. Hydraulic power is supplied to the motor 101 through a suitable hydraulic conduit complex (not shown) connected to the combines' power plant via the tow bar 62.

At the juncture of the horizontal top run 93 and the vertical rear run 94 in the loop conveyor conduit 87, a grain unloading arm assembly 105 is rotatably mounted. To this end the conduit 87 contains, at the juncture of the horizontal top conveyor run 93 and the vertical rear conveyor run 94, an outlet fitting 107. The arm assembly 105 is mounted on the fitting 107 for rotating movement about the fitting. The arm assembly 105 comprises a generally horizontal delivery tube 111 with a downwardly opening spout 112 at its free end. The delivery tube 111 contains a conventional augur auger conveyor 115 extending between its inlet end 116 and the spout 112. The auger conveyor 115 is hydraulically driven by a suitable hydraulic motor (not shown) powered from the combine 10.

The loop conveyor conduit 87 has a sliding grain inlet door 121 above it, in the floor 72 of the grain module body 52. It has a sliding grain outlet door 123 in the bottom of the conveyor conduit 87 adjacent the rear of its top run 93.

In operation of the combine 10 using the grain module 50, grain is delivered to the front end of the grain bin in the module body 52 through the unloading conduit 33 from the combine grain tank 20. The grain falls through the open top 82 of the bin on one side or the other of the loop conveyor conduit 87 and piles up on the floor 72.

When the module grain bin is nearly full adjacent its front end, the conduit door 121 is opened and the conveyor 89 begins carrying grain in a clockwise direction through the conduit 87. The outlet door 123 in the conduit 87 is also opened, and grain falls through it into the rear of the bin.

When unloading is called for, the outlet door 123 is closed. Grain in the conduit 97 is then carried to the outlet fitting 107 and literally thrown through the fitting by the moving conveyor 89. Operation of the carrier unloading arm assembly 105 is then effective to unload the grain module body 52.

Figure 4:
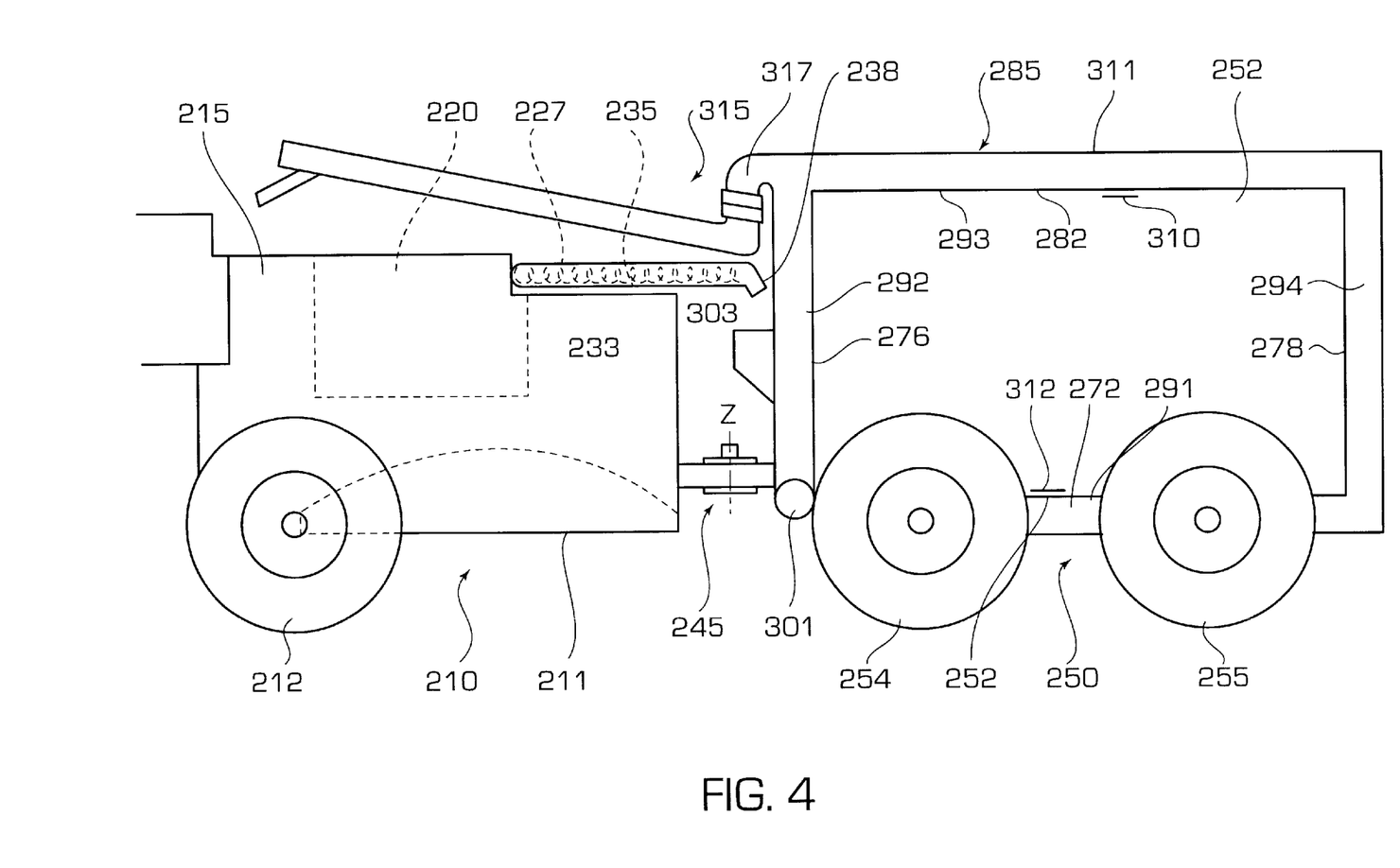
FIG. 4 is a side elevational view of an articulated combine and grain module comprising features of another embodiment of the invention.
Figure 5:
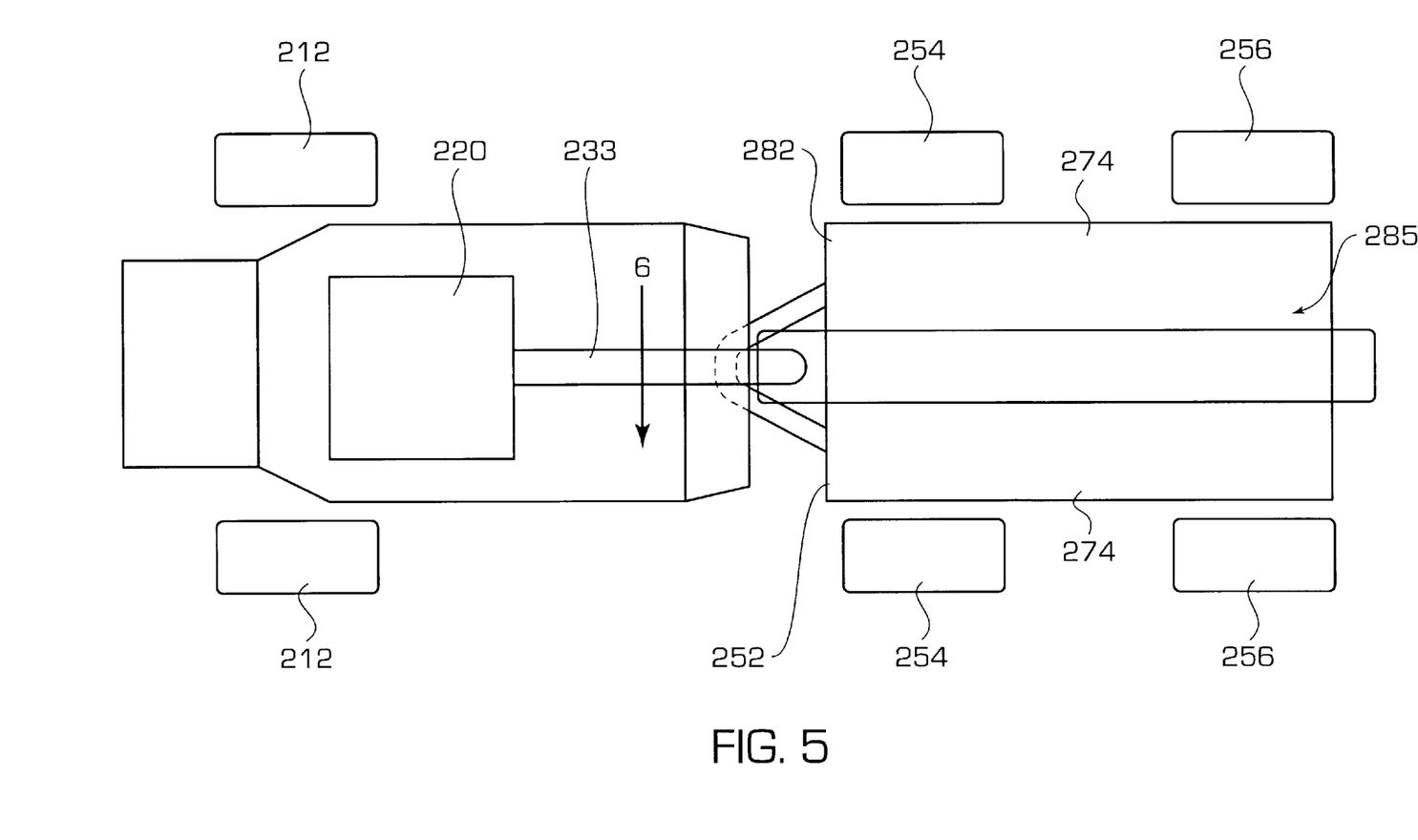
FIG. 5 is a top plan view of the articulated combine and grain module seen in FIG. 4.
Figure 6:
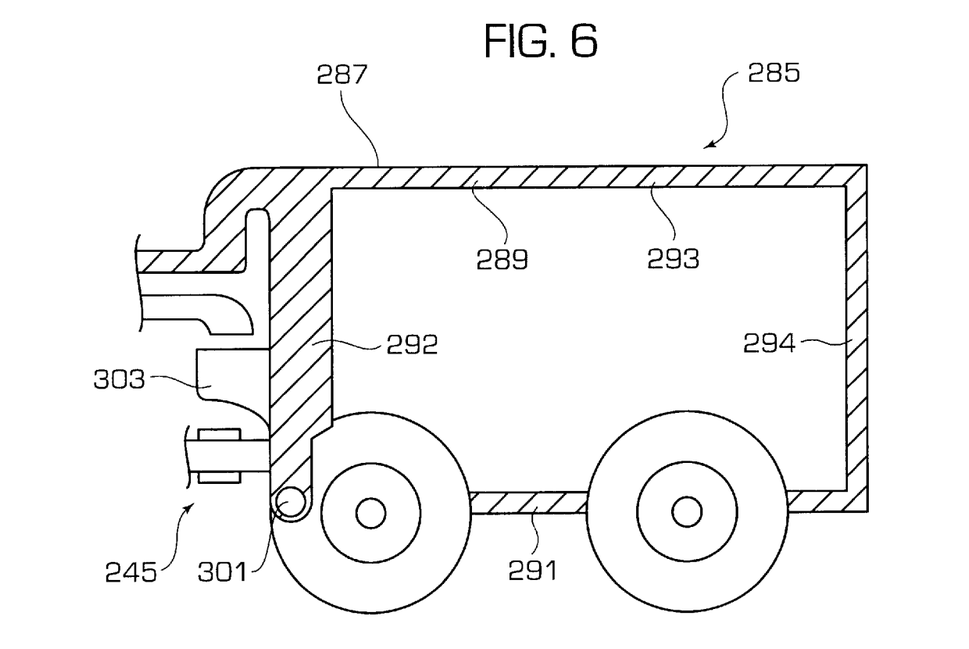
FIG. 6 is an enlarged vertical sectional view through the grain module seen in FIG. 5, taken along line 6—6 of FIG. 5.

Referring now to FIGS. 4–6, another embodiment of the invention is seen in the form of an articulated combine 210. The combine 210 includes a harvester section 240 and a grain module section 250 connected in articulated relationship at the articulation joint 245. The joint 245 permits the two sections 240 and 250 to pivot relative to each other about the articulations axis Z of the joint.

The harvester section 240 includes a chassis 211 supported by two front wheels 212. The chassis 211 mounts a body 215 containing an internal combustion engine (not shown) which supplies power to the front wheels 212. The body contains a rotary threshing assembly (not shown) and a grain tank 120.

As described in the context of the previous embodiment of the invention, the harvester section 240 has a header assembly (not shown) and feeder assembly (not shown) on its front end. Cut crop is delivered to the harvester section from the header assembly by the feeder assembly.

The rotary threshing assembly threshes the grain from its stalks and chops up the stalks into straw and chaff. Separated grain is deposited on a sieve assembly (not shown). The grain falls through the sieve assembly onto a grain pan and from there into a conveyor which elevates it into the grain tank 220.

According to the invention, when grain in the tank 220 accumulates to the extent that the tank is almost full, the grain begins to flow into the intake of a transfer conveyor 233. The transfer conveyor 233 comprises a horizontally elongated transfer conduit 235 containing an auger conveyor 237. The conduit 235 has a downwardly opening spout 238 at its rear end for discharging grain into the grain module section 250.

The grain module section 250 is a four-wheel vehicle comprising an axially elongated, rectangular body 252 carried by a pair of front wheels 254 and a pair of rear wheels 255. The wheels are rotatably mounted on axles which support the body 252.

The grain module body 252 includes a horizontal floor 272, a pair of vertical sidewalls 274 and vertical front and rear walls 276 and 278. The body, walls and floor form a grain tank, the top of which is a horizontal roof 282.

Encircling the grain module body 252, from front-to-back, is a loop conveyor assembly 285. The loop conveyor assembly 285 includes a hollow conduit 287 containing a continuous loop chain and paddle conveyor 289.

The loop conveyor conduit 287 includes a horizontal bottom run 291, a vertical front run 292, a horizontal top run 293 and a vertical rear run 294. The conveyor conduit 287 circles the module body 252 mid-way between its side walls 274.

The continuous loop, paddle conveyor 289 is selectively driven in a clockwise direction or a counterclockwise direction through the conduit 287 by a hydraulic drive motor 301 mounted on the front wall 276 of the body 252. Hydraulic power is supplied to the motor 301 through a suitable hydraulic conduit complex (not shown) connected to the combine's power plant.

When the module 250 is loading, the conveyor 289 is driven in a counterclockwise direction. Grain from the tank 220 is delivered through the transfer conveyor into a grain inlet well 303 on the front end of the grain module body 252. The well 303 opens through the front wall 276 into the conduit 287.

The paddle conveyor 289 in the conduit 287 carries the grain up into the horizontal top run 293 of the conveyor. There, midway between the front and rear walls 276 and 278 of the bin, the conduit 289 has a sliding door 310 in its floor 311. This sliding door 310 is open during this loading operation so that grain can fall into the tank.

The capacity of the front section tank 220 and the rear section tank far exceeds that of conventional combines. Accordingly, the combine 210 is able to operate for much longer periods of time without a truck to unload it.

When unloading is called for, however, the sliding door 310 in the top run of the conduit 287 is closed. The conveyor 289 is driven in a clockwise direction and a sliding door 312 in the bottom run 291 of the conduit 289 is opened. Grain falls through the open door 312 and is carried around the conduit 287 to the unloading conveyor arm assembly 315.

The conveyor assembly 315 is mounted on the conduit 287 at the juncture of the horizontal top run 293 and the vertical front run 292 in the conduit. To this end the conduit 287 contains an outlet fitting 317. The conveyor arm assembly 315 is mounted on the fitting 317 for rotation horizontally about the fitting.

Grain in the conduit 297 during unloading is carried to the outlet fitting 317 and thrown through the fitting by the moving conveyor 289. Operation of the unloading arm assembly 315 is then effective to unload the module body 252.

Figure 7:
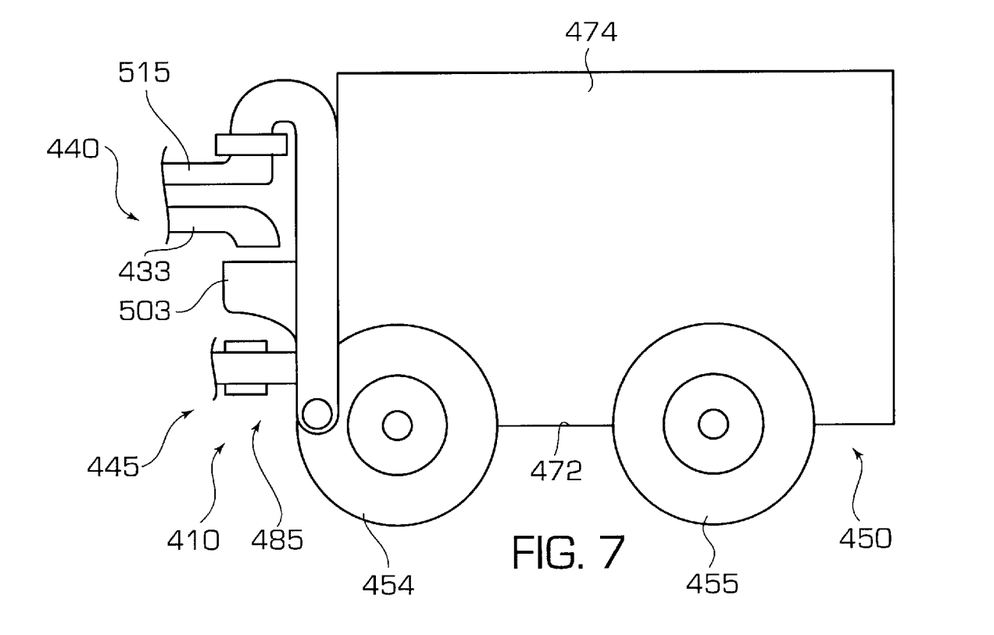
FIG. 7 is a side elevational view of a portion of an articulated combine and grain module comprising features of a variation in the other embodiment of the invention.
Figure 8:
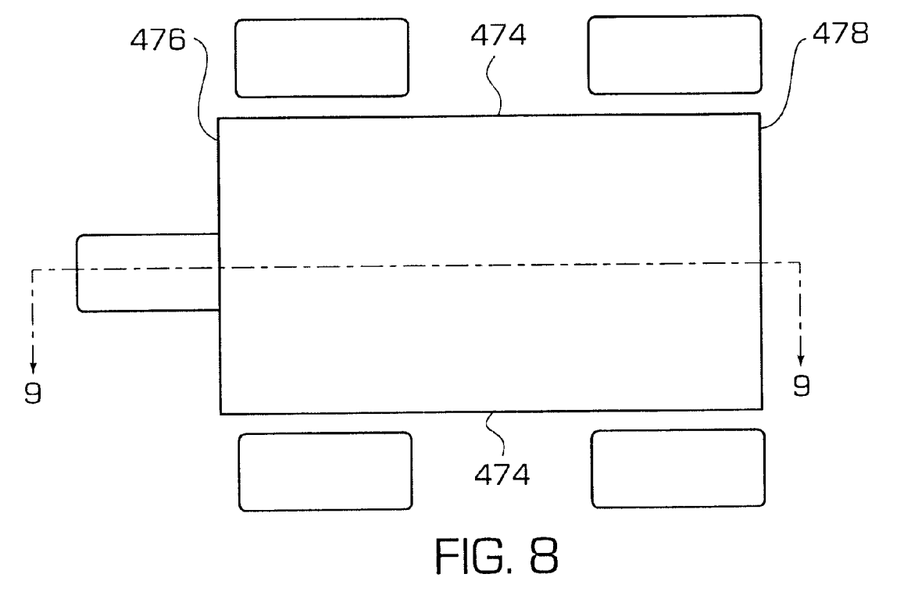
FIG. 8 is a top plan view of the portion of the articulated combine and grain module seen in FIG. 7.
Figure 9:
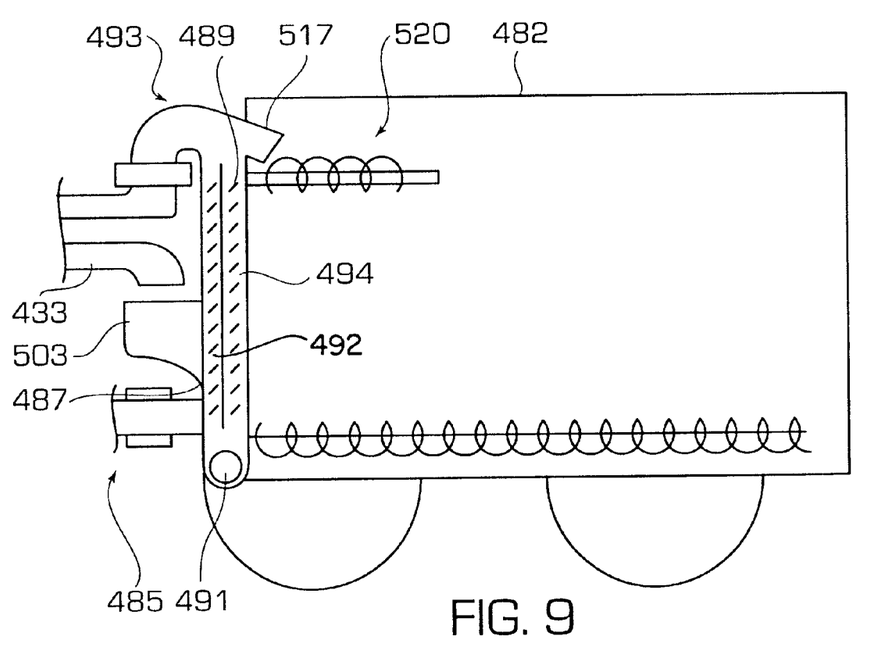
FIG. 9 is an enlarged vertical sectional view through the grain module seen in FIG. 7, taken along line 9—9 of FIG. 8.

Referring now to FIGS. 7–9, a variation on the other embodiment of the invention is seen in the form of an articulated combine 410. The combine 410 includes a harvester section 440 (only partially shown) and a grain module section 450 connected in articulated relationship at the articulation joint 445.

The harvester section 440 is identical to the harvester section 240 hereinbefore discussed. Accordingly, any components shown are simply identified by identical reference numerals plus 200 digits.

The grain module section 450 is a four-wheel vehicle comprising an axially elongated, rectangular body 452 carried by a pair of front wheels 454 and a pair of rear wheels 455. The body 452 includes a horizontal floor 472, a pair of vertical sidewalls 474 and vertical front and rear walls 476 and 478. A horizontal roof 482 covers the body 452.

Mounted on the front wall 476 of the body 452 is a loop conveyor assembly 485. The loop conveyor assembly 485 includes a hollow conduit 487 containing a continuous loop chain and paddle conveyor 489. The loop conveyor conduit 487 includes a short horizontal bottom run 491, a vertical front run 492, a short horizontal top run 493 and a vertical rear run 494.

The continuous loop, paddle conveyor 489 is selectively driven in a clockwise direction or a counterclockwise direction through the conduit 487 by a hydraulic drive motor 501 mounted on the front wall 476 of the body 452. Hydraulic power is supplied to the motor 501 through a suitable hydraulic conduit complex (not shown) connected to the combine's power plant.

When the module 450 is loading, the conveyor 489 is driven in a clockwise direction. Grain from the tank 420 is delivered through the transfer conveyor 43 into a grain inlet well 503 on the front end of the grain module body 452. The well 503 opens into the vertical front run 492 of the conduit 487. The conveyor 489 carries grain upwardly in the vertical run 492 and over the short horizontal run 493, and throws the grain through the nozzle 519 into the body 452.

When grain piles up in the body 452 to a level near the top of the body, it encounters a horizontal auger 520. The auger 520, which rotates constantly during loading, moves any grain which reaches that level toward the rear of the body 452.

To unload the module 450, the conveyor 428 is driven in a counter-clockwise direction in the conduit 487. A horizontal auger 525 mounted immediately above the floor 472 of the body 452 is rotated and moves grain at the bottom of the grain pile into the conduit 487.

Grain carried by the auger 525 into the conduit 487 is lifted up the rear run 494 of the conduit 487 by the conveyor 489. The unloading grain is carried over the short top run 493 of the conduit and thrown into the fitting 517. The unloading conduit 515 then carries it to a waiting grain truck alongside the combine 410.

While preferred embodiments of the invention have been described, it should be understood that the invention is not so limited and modifications may be made without department from the invention. The scope of the invention is defined by the appended claims, and all devices that come within the meaning of the claims, either literally or by equivalence, are intended to be embraced therein.

What is claimed is:

1. In combination with an agricultural combine, a grain module for accumulating, transporting and unloading grain received from a harvesting assembly in the combine, comprising:

a) a longitudinally extending grain tank including a bottom wall, side walls and front and rear walls;

b) wheels supporting said grain tank for travel over the ground;

c) an endless conveyor conduit including a top run, a bottom run and a pair of vertical runs;

d) an inlet to said tank for introducing grain to said tank; and e) an outlet from said tank for discharging grain from said tank;

f) said outlet from said tank being through said conduit.

2. The grain module of claim 1 further characterized in that:
   a) said pair of vertical runs comprise a front vertical run and a rear vertical run; and
   b) said outlet comprises an access port to at least one of said bottom run and said rear vertical run.

3. The grain module of claim 2 further characterized in that:
   a) said outlet further comprises an elongated unloader conveyor tube connected to said top run.

4. The grain module of claim 1 further characterized in that:
   a) said conduit includes front and rear vertical runs longitudinally spaced from each other.

5. The grain module of claim 4 further characterized in that:
   a) said front run is on the outside of said front wall and said rear run is on the outside of said rear wall.

6. The grain module of claim 1 further characterized in that:
   a) said conduit includes front and rear vertical runs which are immediately adjacent each other.

7. The grain module of claim 6 further characterized in that:
   a) both said front and rear vertical runs are on the outside of said front wall.

8. The grain module of claim 1 further characterized in that:
   a) said tank is supported by two wheels approximately midway between said front and rear walls;
   b) said module being connected to said combine at a universal hitch on the rear of said combine.

9. The grain module of claim 2 further characterized in that:
   a) said outlet comprises a grain door in the bottom wall of said tank.

10. An articulated agricultural combine, comprising:
    a) a front section including a chassis supported by front wheels and carrying a threshing assembly; and
    b) a rear section including a grain module supported by front and back wheels;
    c) said front and rear sections being connected in articulated relationship so that said rear section supports said front section;
    d) said grain module including a longitudinally extending module grain tank including a bottom wall, opposed side walls and front and rear walls;
    e) said grain module also including an endless conveyor conduit including a top run, a bottom run and separate front and rear vertical runs, forming a continuous loop; and
    f) a conveyor element in each of said runs for moving grain therethrough.

11. The articulated agricultural combine of claim 10 further characterized by and including:
    a) a combine/front section grain tank in said front section; and
    b) a transfer conveyor for transferring grain from said front section grain tank to said module grain tank.

12. The articulated agricultural combine of claim 11 further characterized by and including:
    a) means on said grain module for moving grain longitudinally of said module grain tank.

13. The articulated agricultural combine of claim 11 further characterized in that:
    a) said front run is mounted adjacent said front wall; and
    b) said rear run is mounted adjacent said rear wall.

14. The articulated agricultural combine of claim 11 further characterized in that:
    a) said front and rear runs are both mounted adjacent said front wall.

15. The articulated agricultural combine of claim 11 further characterized in that:
    a) said transfer conveyor is adapted to convey grain from said front section grain tank into said front run.

* * * * *